United States Patent [19]

Silverberg

[11] Patent Number: 4,893,249

[45] Date of Patent: Jan. 9, 1990

[54] MAILING MACHINE

[75] Inventor: Morton Silverberg, Westport, Conn.

[73] Assignee: Pitney Bowes, Inc., Stamford, Conn.

[21] Appl. No.: 134,492

[22] Filed: Dec. 17, 1987

[51] Int. Cl.[4] ............................................. B65G 17/26
[52] U.S. Cl. ............................. 364/464.03; 198/463.3; 198/606; 198/607; 364/464.02
[58] Field of Search ............. 53/266 A; 209/584, 900; 271/4, 10; 364/464.02, 464.03, 466; 198/463.3, 606, 607, 461, 418.9

[56] References Cited

U.S. PATENT DOCUMENTS

| | | | |
|---|---|---|---|
| 2,934,009 | 4/1960 | Bach et al. | 101/235 |
| 3,576,163 | 4/1971 | Lawson | 101/233 |
| 3,661,383 | 5/1972 | Morrison | 355/102 X |
| 3,791,293 | 2/1974 | Rastorguyeff et al. | 101/234 |
| 3,877,531 | 4/1975 | Storace et al. | 177/1 |
| 3,878,025 | 4/1975 | Storace et al. | 156/441.5 |
| 3,878,777 | 4/1975 | Clary | 101/93.28 |
| 3,901,797 | 8/1975 | Storace et al. | 177/50 X |
| 3,904,946 | 9/1975 | Dlugos et al. | 198/356 X |
| 4,238,024 | 12/1980 | Hirakawa et al. | 198/418.9 |
| 4,331,328 | 5/1982 | Fasig | 198/461 X |
| 4,436,298 | 3/1984 | Donner et al. | 271/10 |
| 4,451,027 | 5/1984 | Alper | 271/10 |
| 4,516,209 | 5/1985 | Scribner | 209/900 X |
| 4,524,426 | 6/1986 | Eckert et al. | 364/900 |
| 4,579,054 | 4/1986 | Buan et al. | 101/91 |
| 4,595,188 | 6/1986 | Wiley et al. | 271/4 |
| 4,609,421 | 9/1986 | Yui | 156/442.1 |
| 4,655,131 | 4/1987 | Kramer | 101/236 |
| 4,665,821 | 5/1987 | Harry et al. | 101/110 |
| 4,676,329 | 6/1987 | Reichmuth et al. | 177/165 |
| 4,712,359 | 12/1987 | DePasquale et al. | 53/266 A X |

Primary Examiner—Parshotam S. Lall
Assistant Examiner—Edward R. Cosimano
Attorney, Agent, or Firm—Charles G. Parks, Jr.; David E. Pitchenik; Melvin J. Scolnick

[57] ABSTRACT

A mailing machine in which the mail is directed to a weighing station and laterally deflected at the weighing station, to enable overlap in the feeding of mailpieces to the weighing station. The weighing station includes means for stopping the mailpieces from movement in the direction in which they had been transported thereto. The transport path of the mail in the machine may be vertically V-shaped, or horizontally in parallel paths that are preferably in opposite directions. The input feeder may include two serially coupled horizontal conveyors for conveying horizontal stacks or vertical oriented envelopes, with the first of the conveyors running a slower speed than the last conveyor. A vertical conveyor advantageous transports the envelopes from the last horizontal conveyor.

25 Claims, 3 Drawing Sheets

MAILING MACHINE

BACKGROUND OF THE INVENTION

This invention relates to mailing machines, and is especially directed to machines adapted to receive mailpieces on which indicia is to be printed, weigh such mailpieces, print the indicia thereon, and then output the imprinted mailpieces. Mailing machines of this type also may include moistening and sealing arrangement, for moistening flaps of envelopes and sealing them, thereby to more fully automate the process of preparing mailpieces for mailing.

In the past, machines of the above type have generally processed mailing pieces in a single horizontal course, i.e., the input, output, and various processing stations are serially located at generally the same horizontal level in the mailing machine. This arrangement has been found to reduce the throughput at which mailing pieces can be processed, both as a result of input and output stacking arrangement that need be employed, as well as the requirement for slowing down the mailpieces as various processing stages, for example, during weighing. In addition, mailing machines of the above type have generally required large space, i.e., they have large "footprints".

SUMMARY OF THE INVENTION

The present invention is therefore directed to the provision of a mailing machine having a reduced footprint, as well as increased capacity.

Briefly stated, in accordance with one feature of the invention, a plural object processing system, e.g., a mailing system, is provided having a processing station, and input station, a first transporting means for sequentially feeding objects from the input station to the processing station, and output station, and a second transporting means for sequentially directing objects from the processing station to the output station. In accordance for the invention, the first and second transporting means are arranged to transport the object respectively in first and second substantially opposite direction.

The processing station may comprise a weighing apparatus, and deflecting means may be provided for stopping the motion of objects in the first direction, and deflecting them to the weighing means. As a consequence, the speed of processing the objects may be increased due to the possibility of overlap thereof at the processing station.

In a further feature in accordance with the invention, a mailing system is provided having an input station, a weighing station, a first transporting means for transporting mailing pieces from the input station to a weighing station, a second transporting means for feeding mailing pieces from the weighing station to the printing station, and an output station for receiving mailing pieces marked with indicia. In accordance with the invention, the two transporting means are arranged to transport the mailing pieces respectively in first and second substantially opposite directions. Reference to substantially opposite directions herein includes directions that may define generally a V-shape. The paths may be generally vertical, or generally horizontal.

The reversal of direction of the mailing pieces, in accordance with one embodiment of the invention, enables overlap of the mailing pieces at a weighing station, to thereby minimize any delays that are caused by the requirements for weighing the mailing pieces. The effect of the increase in this speed may also be obtained by feeding of the mailing pieces as the same direction, although parallel to the input direction, although in this case the footprint of the mailing machine is increased. When the transporting paths in the mailing machine are generally V-shaped, as in the vertical direction, a further advantage is achieved in enabling an increase in the input feed of the mailing machine, by feeding the mailing pieces in horizontal stacks. This embodiment of the invention further minimizes the footprint of the machine.

BRIEF DESCRIPTION OF THE DRAWINGS

In order that the invention may be more clearly understood, it will now be disclosed in greater detail with reference to the accompanying drawings, wherein.

DETAILED DESCRIPTION OF THE PREFERRED EMBODIMENT

Figure 1:
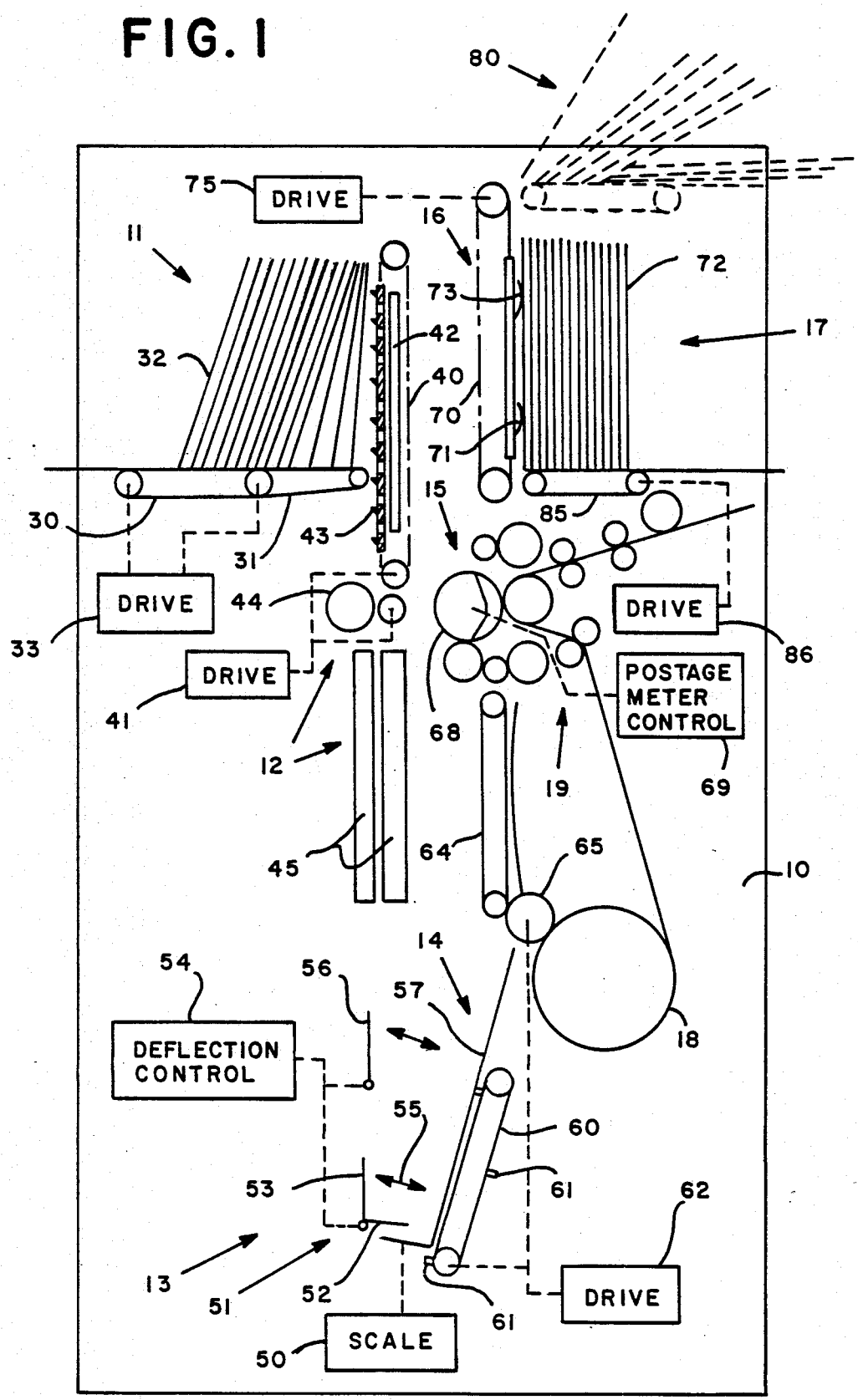
FIG. 1 is a simplified illustration of a mailing machine in accordance with one embodiment of the invention.

Referring now to the drawings, and more in particular to FIG. 1, therein is illustrated one embodiment of a mailing machine in accordance with the invention. The illustration depicts a housing 10 within which the elements of the mailing machine are enclosed. The machine generally incorporates an input station 11, preferably a high capacity feeder adapted to feed envelopes or the like of mixed thickness. A first transporting system 12 is provided for separately sequentially transporting mailpieces from the input station 11 to a weighing station 14. In the illustrated embodiment of the invention, the transporting station carries the mailpieces downwardly to a deflector 13 which deflects the mailpiece laterally to the weighing station 14. The weighing station 14 serves to weigh the mailpieces "on the fly". The weighing station 14 includes conveying means for conveying the weighed mailpieces upwardly from the weighing station 14 to a postage metering station 15, at which indicia is applied to the mailpieces, in accordance with the weight determined at the weighing station 14. From the postage metering station 15 the mailpieces are transported upwardly, for example by a further transporting station 16 to an output station 17, the mailing machine may incorporate a tape supply 18, and a still further transporting station 19 for feeding the tape from the supply 18 to the mailing station, to enable an alternative operation of the mailing machine in the marking of indicia on the tape, for later application to mailpieces such as envelopes, packages or the like.

Before continuing with a detailed discussion of the structure illustrated in FIG. 1, it will be noted that the path for the mailpieces, from the input station to the output station, is folded into a vertical "V", the bottom of the V being defined generally at the weighing station. This configuration reduces the required floor space of the mailing machine, since lateral space is not necessary for most of the transporting functions between the processing stations. The arrangement further provides a high capacity input feed, and output stacking trays. In view of the use of the V configuration for the path of the mailing pieces, and the use of a weighing station at the lower portion of the V, the input of mailing pieces may be increased since there may be an overlap between mailpieces arriving at the weighing station and mailpieces being ejected from the weighing station.

In addition to requiring less floor space than a conventional mailing machine, i.e., a smaller "footprint", the mailing machine in accordance with the invention also provides additional space for such functions as moistening and sealing, as well as the provision of a large postal tape supply for printing indicia on tape.

Referring to FIG. 1, the input station 11 may be comprised of first and second serially connected conveyors 30 and 31 for conveying mailpieces 32 in a generally or substantially horizontal direction. The mailpieces 32 extend generally vertically, i.e., are stacked in a substantially horizontal stack. A drive 33, for example a motor drive, is provided for driving the conveyors 30 and 31, with the conveyer 30 being driven at a lower rate of the conveyor 31. The conveyors 30 and 31 may be conventional conveyors, such as conveyor belts.

In known horizontal feeding arrangement, a pushing member is generally provided for pushing the free end of the stack, in order to urge the stack towards the transporting station. In arrangements of this kind, however, the adding of materials to the stack is rendered difficult, since it is necessary for an operator not only to add additional material to the stack, but also to manually retract the pushing member, the effecting of the two tasks simultaneously being difficult to accomplish with only two hands.

The provision of a horizontal input stack provides the advantage that the stack can be as long as desired without creating large forces between the envelopes at the bottom of the stack, as in the case of a bottom feeder. The stack of mailpieces is inclined against the right hand end of the input station (as defined by the transporting station 12), with the final conveyor 31 straightening the mailpieces to vertical alignment before they are fed downwardly into the rest of the system. Since the size of the stack is not limited, as in the case of the bottom feeder, a larger number of mailing pieces may be stacked, to more readily enable a high capacity feed of mailpieces, i.e., the number of mailpieces fed per unit time may be increased without materially increasing the frequency of operator reloading.

In accordance with the embodiment of the invention as illustrated in FIG. 1, the transporting station 12 for transporting the mailpieces to the weighing station 13 is arranged to transport the mailpieces directly downwardly from the input station 11, i.e., at the right hand end of the last conveyor 31. As an example of a transporting arrangement that may be employed, a vertical conveyor 40 is driven by drive 41 downwardly at the end of the input station, to pick up the right hand most mailpiece by friction. A vacuum supply 42 may be provided behind the left hand course of the conveyor 40, in order to assist in holding the end most mailing piece to the conveyor 40 as necessary for this purpose. In addition, projections 43 may be provided on the conveyor 40, serving as a friction retard to separate the mailpieces. The projections 43 thus enable the picking up of mailpieces of variable thickness, and separating them from the remainder of the stack. The conveyor 40 feeds the mailpieces downwardly to the input of a pair of take away rollers 44, the take away rollers being controlled for example by the drive 41 to momentarily hold the mailpieces at a determined location so that they may be fed downwardly at the proper instant to maximize the throughput of the device while avoiding interference between the sequential mailpieces for example at the weighing station.

The transporting station 44 may further include a conventional moistener-sealer station 45, for moistening the flaps of envelopes and sealing them in conventional manner, if desired. This is feasible in the system in accordance with the invention, without increasing the footprint of the machine, in view of the fact that the mailpieces are directed vertically at this portion of the system.

Since the mailpieces are fed vertically from the input station, the advantages of providing a high capacity input feed are retained while not requiring the disadvantage of bending the mailpieces, as would be required if a horizontal transporting mechanism were to be provided at the output of the input feed station.

A member 51 is located below the moistener-sealer station 45 and has a generally horizontally extending arm 52 positioned to stop the downward movement of the mailpieces 32. The member 51 further has a generally upwardly extending arm 53, and the member 51 is controlled in pivotal movement by a deflection control device 54, which may include for example a motor, solenoid of the like. The arm 53 serves to deflect mailpieces received on the member 51, in the direction of the arrow 55, onto the weighing station 14. An additional deflecting arm 56 may also be pivotally controlled by the deflection control 54, to insure that after the mailpiece has been stopped by the arm 52, it will be positively deflected to the weighing station 14.

The weighing station 14 is comprised of a conventional scale 50 attached to the inclined tray 57 and further includes a generally vertically arranged conveyor 60 having projections 61 for engaging the lower sides of the envelope to direct them in a generally vertical path. The weighing station 14 has a drive 62 for controlling the conveyor. The weighing station 14 may have a further conveyor 64 controlled by the drive 62, to take up the mail as it is received at a roller 65, and then direct the mail into the postal meter station 15. The conveying action of 60 is initiated after the scale has had sufficient time to weigh the mailpiece. The postal meter station 16 is a conventional rotary drum type, having a printing drum 68, and controlled by a postage meter control circuit 69. From the postage meter station 15, the imprinted mailpieces are directed upwardly to the conveyor 70 of the transporting station 16, controlled by the drive 75. The conveyor 70, as in the case of the other generally vertically directed conveyors, may have projections for engaging the bottom sides of the mailing pieces. In addition, the conveyor 70 is also preferably provided with spring fingers 71 and 73 resiliently urging the horizontal stack 72 of imprinting mailing pieces away from the conveyor, so that the newly received mailpiece may be stacked at the left hand side thereof. The output station 17 may have a conveyor 85 for moving the mailing pieces away from the conveyor 70, and controlled by a conveyor drive 86. Further output arrangements may be provided as illustrated in dashed lines at 80, for example for receiving and stacking rejected mailpieces or the like from the drive conveyor 70.

The tape spool 18, and the rollers for controlling the operation of the tape, may similarly be controlled by a separate drive, for the printing of indicia on the tape, in conventional manner.

The driving arrangement for the different elements as illustrated in FIG. 1 are illustrated as being separate, and may for example be separately microcomputer controlled driving devices, employing for example type 8051 micro processors, intercoupled to insure synchronization of the operations thereof.

Figure 2:
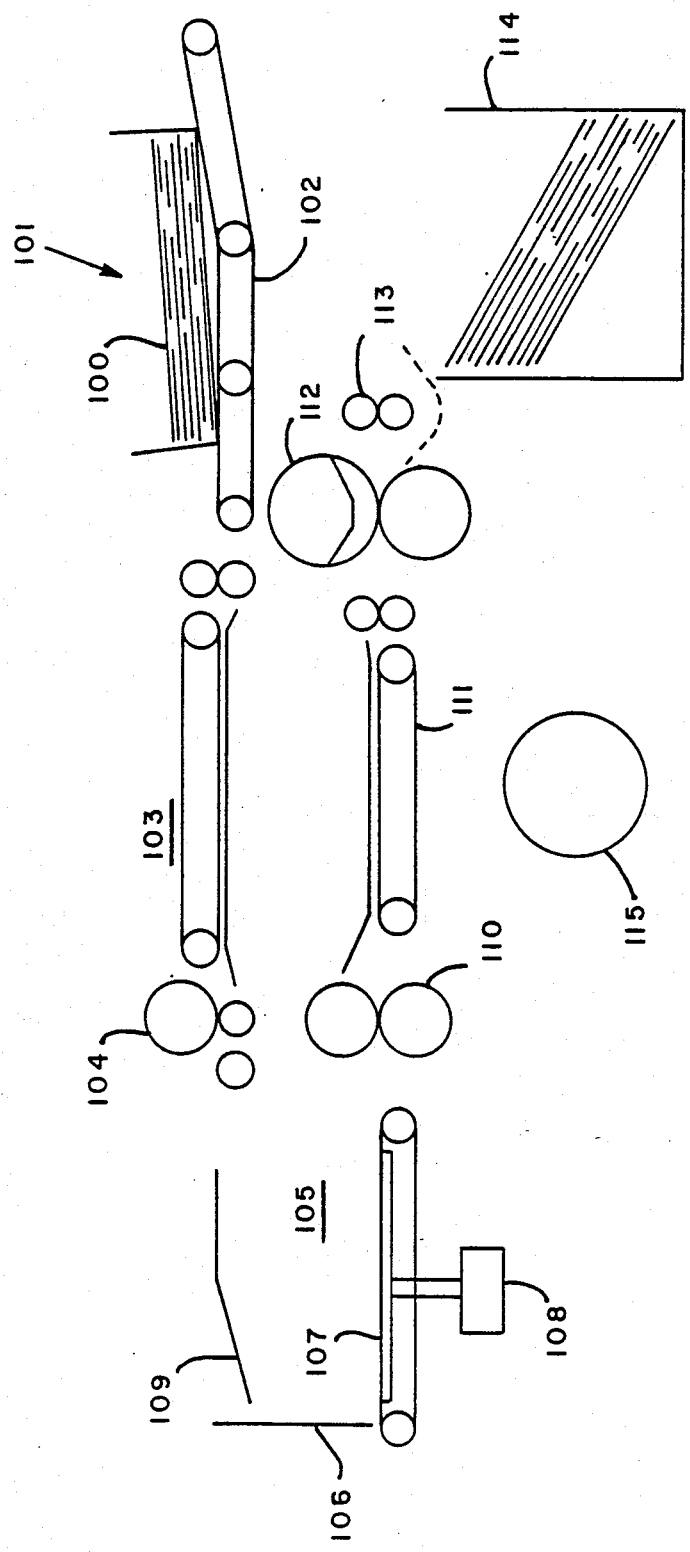
FIG. 2 is a simplified illustration of a modification of the mailing machine.

In a modification of the invention, as illustrated in FIG. 2, the feed of the mailpieces 100 may be horizontal instead of vertically as in the embodiment of FIG. 1. In this arrangement, the stack 101 is a vertical stack, and lattern feeds to the left via a conveyor 102 of conventional form. The conveyor 102 directs the mail horizontally to a moistener-sealer station 103 for moistening the flaps and sealing them in conventional manner. The mailpieces are directed from the moistener-sealer station 103, for example by drive rollers 104, to the weighing station 105. The weighing station has a wall 106 in the path of mail horizontallY received therein, to stop the horizontal movement of the mail and drop it onto a weighing platform 107. The weighing platform 107 is coupled to a conventional scale 108. A deflector 109 may be provided to insure proper deflection of the mailpieces to the platform 107. The mailpieces are then conveyed from the weighing station, by way of rollers 110, and a printer conveyor 111, to the postage meter 112, for example a rotary drum postage meter. The mailpieces are then conveyed for example by conveyors 113, to a stacker 114. This arrangement may also have a tape supply 115, illustrated symbolically, for the separate alternative marking of a tape. It is of course apparent that the embodiment of the invention illustrated in FIG. 2 incorporates the necessary conventionally driving devices for conveying the mailpieces, etc.

While FIG. 2 illustrates the mailpieces as being fed horizontally in one direction to the weighing station, and thence horizontally in the opposite direction to the output stacker, it is of course apparent that, in a modified arrangement, the mail may be fed alternatively to a meter and stacker to the left of the weighing station, i.e., the mailing pieces being feed in the same horizontal direction. This arrangement of course increases the length of the mailing machine, but it provides certain advantages in the increase of the capacity of the device, in view of the weighing of the mail "on the fly", and the fact that overlap of mailing pieces may occur in the weighing station in order to increase the capacitY of the device.

Figure 3:
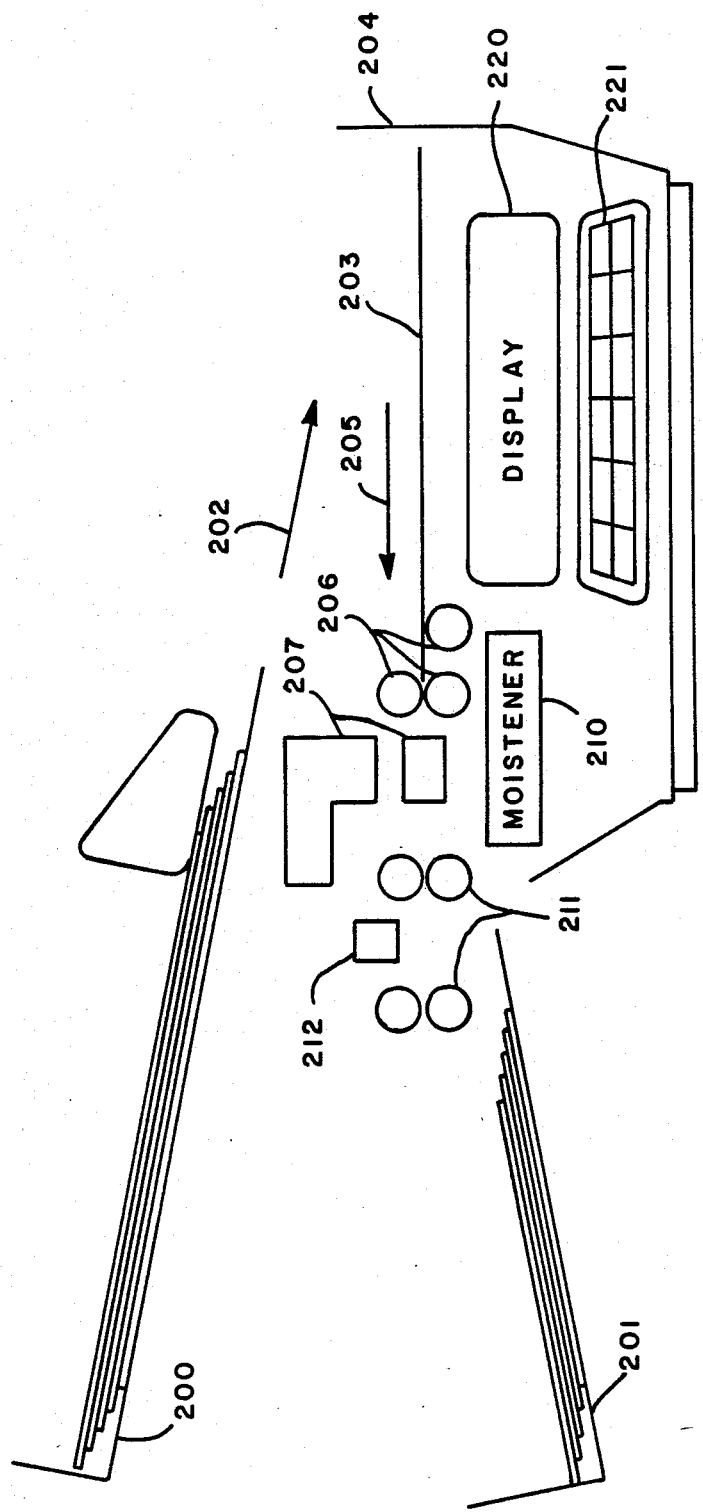
FIG. 3 is a simplified illustration of a still further modification of the invention.

In a modification of the arrangement of FIG. 2, as illustrated in FIG. 3, the input and output trays 200 and 201 may be removable trays adapted to be removably affixed to the mailing machine. The mail is fed from the bottom of the tray 200, as illustrated by the arrow 202, to fall onto the tray 203 of a scale, horizontal movement of the mail being stopped by a generally vertical wall 204. The tray 203 may constitute a conveyor, which, upon receipt of the mail, conveys it in the direction of the arrow 205 via the drive rollers 206, to flat bed or ink jet postage meter 207 for printing in accordance with the weight sensed by the weighing device. A moistener 210 may be provided in this area of the mailing machine, for moistening the flaps thereof. The mailpieces are then fed by way of sealing/exit rollers 211, to seal the flaps and direct the mailpieces onto the output tray 201. In this arrangement, bar codes on the mailpieces may be sensed by a bar codes reader 212, for example for sorting of the mail or the like. The mailing machine may be provided with a display 220 and keyboard 221, for control of the weighing device and postage meter in accordance with conventional practice.

The arrangement of FIG. 3 provides the advantage that the mail is fed face up so that the indicia is readily visible at the output thereof. A conventional feeding arrangement may be provided, and the footprint of the mailing is small. The input and output trays may hang over the edge of a tabletop, if desired, in order to save table space.

While the invention has been disclosed and described with reference to a limited number of embodiments, it is apparent that variations and modifications may be made therein, and it is therefore intending in the following claims to cover each such variation and modification and falls within the true spirit and scope of the invention.

What is claimed is:

1. In a plural object processing system having a processing station, an input station, a first transporting means for sequentially feeding objects from said input station to said processing station, an output station, and a second transporting means for sequentially directing objects from said processing station to said output station; the improvement wherein said first and second transporting means are arranged to transport said objects respectively in first and second substantiallY opposite directions.

2. The system of claim 1 wherein said first and second directions are substantially vertical.

3. The system of claim 1 wherein said first and second directions are substantially horizontal.

4. In a plural object processing system having a processing station, an input station, a first transporting means for sequentially feeding objects from said input station in a first direction to said processing station, an output station, and a second transporting means for sequentially directing objects from said processing station to said output station in a second direction; the improvement wherein said processing station comprises weighing means, and deflecting means for receiving said objects directed in said first direction, stopping motion of said objects in said first direction, and deflecting said objects in a third direction onto said weighing means, said first and second directions extending in substantially parallel plans and said third direction being substantially normal to said planes, whereby said objects may overlap in said processing station, in said third direction, without interfering with the weighing thereof by said weighing means.

5. In mailing system for processing objects to be mailed, and having a first station for applying indicia to said objects, a weighing station for weighing objects, an input station for receiving objects to which indicia is to be applied, a first transporting means for sequentially feeding objects from said input station to said weighing station, said first transporting means having means for transporting said envelopes substantially vertically downwardly to said weighing station, said weighing station comprises means for deflecting said envelopes laterally to a second transporting means, and said second transporting means comprises means for transporting said envelopes substantially vertically upwardly to said first station, an output station for receiving objects marked with indicia, and a third transporting means for sequentially directing objects from said first station to said output station; the improvement wherein said first and second transporting means are arranged to transport said objects respectively in first and second substantially parallel directions.

6. The mailing system of claim 5 wherein said objects are envelopes having unsealed flaps, wherein said second transporting means further comprises means for moistening and sealing said flaps.

7. The mailing system of claim 5 wherein said means for deflecting comprises stopping means for receiving and stopping the vertical movement of downwardly moving envelopes, and pivotally mounted deflecting arms means for deflecting envelopes laterally into engagement with said second transporting means.

8. The mailing system of claim 5 wherein said input station comprises first and second horizontally movable serially arranged conveyor means for directing substantially vertical envelopes to said first transporting means, said second conveyor means having a faster conveying speed than the first conveyor means and being closer to said first transporting means than said first conveyor means.

9. The mailing system of claim 5 further comprising tape supply means, and means directing tape from said tape supply means to said first station, whereby said first station may alternatively apply indicia to envelopes fed thereto by way of said second transporting means and tape from said tape directing means.

10. The mailing system of claim 5 wherein said output station comprises horizontally movable conveyor means for moving substantially vertical envelopes, a spring loaded means for holding envelopes thereon in a vertical position.

11. The mailing system of claim 10 wherein said third transporting means comprises substantially vertically movable conveyor means having spring fingers for holding envelopes on said conveyor means resiliently away from said conveyor means.

12. The mailing system of claim 5 wherein said input station comprises horizontally movable conveyor means for conveying substantially vertical envelopes to said first transporting means, said first transporting means comprising vertically intermittently movable belt means positioned to engage envelopes on said conveyor means.

13. The mailing system of claim 12 wherein said belt means has friction retarding means for engaging said envelopes.

14. The mailing system of claim 13 further comprising vacuum means for holding envelopes to said belt means.

15. The mailing system of claim 5 wherein said first transporting means comprises means for transporting said envelopes substantially horizontally to said weighing station, said weighing station comprises means for stopping horizontal movement of said envelopes whereby said envelopes drop onto said weighing station, and said second transporting means comprises means for transporting said envelopes substantially horizontally to said first station.

16. The mailing system of claim 15 wherein said second transporting means comprises means for conveying envelopes in a horizontal direction substantially opposite that of said first transporting means.

17. The mailing system of claim 15 wherein said input station comprises means for feeding envelopes from the bottom of a vertical stack of envelopes.

18. In a transporting system for transporting objects arranged in a horizontal stack, and including a horizontally movable conveyer means for receiving said stack, the improvement wherein said conveyor means comprises a first conveyor, a second conveyor for directing objects onto said first conveyor, means for driving said first conveyor at a faster rate than said second conveyor and a vertical transporting conveyor for transporting objects vertically, said vertical conveyor being arranged adjacent the output end of said first conveyor and serving as a horizontal stop for objects on said first conveyor, whereby said objects may be manually loaded on said second conveyor and are vertically oriented by said first conveyor against said vertical transporting conveyor.

19. The transporting system of claim 18 wherein said vertical conveyor comprises a conveyor belt having retarding means for engaging said objects.

20. The transporting system of claim 19 further comprising a vacuum source for holding said objects on said first conveyor against said vertical conveyor.

21. In a transporting system for transporting objects, said system having a processing station for processing said objects, a first conveyor for conveying said objects to said station in a first direction, and a second conveyor for conveying said objects from said station in a direction substantially parallel to said first direction, said processing station having a first position at which said objects are processed; the improvement wherein said station comprises stop means positioned to stop the movement of said objects received thereby in said first direction at a second position displaced from said first position in a third direction substantially perpendicular to said first direction, said processing station being arranged to enable movement of objects received thereby in said third direction from said second to said first positions, whereby an object may be received at said second position of said station, from said first conveyor, that overlaps, in said third direction, a previously received object at said first position of said station, without interfering with processing of said object at said first position.

22. The transporting system of claim 21 wherein said first and second directions are substantially vertical, and said processing means comprises means for deflecting said objects in said third direction.

23. The transporting system of claim 22 wherein said processing station comprises a scale for weighing objects at said first position.

24. The transporting system of claim 21 wherein said first and second directions are substantially horizontal, and said first position is below said second position, whereby objects received at said second position drop by gravity to said first position.

25. The transporting system of claim 24 wherein said processing station comprises a scale for weighing objects at said first position.

* * * * *